United States Patent
Karaoguz et al.

(10) Patent No.: US 11,228,721 B2
(45) Date of Patent: Jan. 18, 2022

(54) ELECTRONIC DEVICE FOR AUTOMATICALLY SELECTING A SURVEILLANCE CONFIGURATION FOR A ROAD TRAFFIC AREA, ASSOCIATED SELECTION METHOD AND COMPUTER PROGRAM

(71) Applicant: TRANSDEV GROUP, Issy les Moulineaux (FR)

(72) Inventors: Cem Karaoguz, Palaiseau (FR); Alexis Beauvillain, Massy (FR)

(73) Assignee: TRANSDEV GROUP, Issy les Moulineaux (FR)

( * ) Notice: Subject to any disclaimer, the term of this patent is extended or adjusted under 35 U.S.C. 154(b) by 0 days.

(21) Appl. No.: 16/825,436

(22) Filed: Mar. 20, 2020

(65) Prior Publication Data
US 2020/0304726 A1 Sep. 24, 2020

(51) Int. Cl.
*H04N 5/247* (2006.01)
*G06Q 40/00* (2012.01)
*G08G 1/04* (2006.01)
*H04N 7/18* (2006.01)

(52) U.S. Cl.
CPC .............. *H04N 5/247* (2013.01); *G06Q 40/12* (2013.12); *G08G 1/04* (2013.01); *H04N 7/181* (2013.01)

(58) Field of Classification Search
CPC ........ G06Q 40/12; G08G 1/0116; G08G 1/04; G08G 1/048; G08G 1/164; G08G 1/166; H04N 5/247; H04N 7/181
See application file for complete search history.

(56) References Cited

U.S. PATENT DOCUMENTS

| | | | | |
|---|---|---|---|---|
| 2013/0090905 A1* | 4/2013 | Gupta | ................. | G08G 1/0108 703/6 |
| 2017/0327035 A1* | 11/2017 | Keiser | ................. | G08G 1/0133 |
| 2018/0190111 A1* | 7/2018 | Green | .................... | G08G 1/052 |
| 2019/0293775 A1* | 9/2019 | Wasselin | ................ | G01S 13/50 |

FOREIGN PATENT DOCUMENTS

| | | |
|---|---|---|
| CN | 105702030 B | 7/2018 |
| WO | 2012/015156 A2 | 2/2012 |
| WO | 2018/011511 A1 | 1/2018 |

OTHER PUBLICATIONS

French Search Report for Application No. FR1902943, dated Jan. 31, 2020, in 2 pages.
Zalik, Borut, "Two efficient algorithms for determining intersection points between simple polygons." Computers & Geosciences 26 (2000) 137-151.

* cited by examiner

*Primary Examiner* — Farzana Hossain
(74) *Attorney, Agent, or Firm* — Knobbe, Martens, Olson & Bear, LLP (57) ABSTRACT

An electronic device automatically selects a surveillance configuration for a road traffic area by sensor(s) among a set of configurations of at least one sensor. The set includes at least two separate configurations. The road traffic area is segmented into M different regions with M≥1. At least one coverage area is being associated with each sensor. The device includes a determining module configured to determine intersections between each region and each coverage area, respectively, and an optimization computing module configured to determine, from the intersections, at least one optimal surveillance configuration corresponding to a sensor configuration or a combination of sensor configurations providing at least one maximal coverage.

10 Claims, 5 Drawing Sheets

ELECTRONIC DEVICE FOR AUTOMATICALLY SELECTING A SURVEILLANCE CONFIGURATION FOR A ROAD TRAFFIC AREA, ASSOCIATED SELECTION METHOD AND COMPUTER PROGRAM

CROSS-REFERENCE TO RELATED APPLICATION

This application claims priority to French Patent Application No. 19 02943 filed on Mar. 21, 2019, the disclosure of which including the specification, the drawings, and the claims is hereby incorporated by reference in its entirety.

FIELD OF THE INVENTION

The present invention relates to an electronic device for automatically selecting a surveillance configuration for a road traffic area by sensor(s) among a set of configurations of at least one sensor, the set comprising at least two separate configurations.

The invention also relates to a selection method, the method being carried out by such an electronic selection device.

The invention also relates to a computer program including software instructions which, when executed by a computer, implement such a selection method.

The invention relates to the field of the secure driving of motor vehicles, and in particular the field of the automatic driving of autonomous motor vehicles.

BACKGROUND OF THE INVENTION

Indeed, in the field of the secure driving of automobiles, and in particular in autonomous driving, one of the main issues is the early identification of obstacles on the path of a moving vehicle, making it possible to take corrective measures so that the vehicle does not strike these obstacles.

The considered obstacles are of any type, for example stationary obstacles, such as safety railings, parked vehicles, or moving obstacles, for example other vehicles or pedestrians. It will be understood that it is critical to avoid any collision between a moving vehicle and such obstacles.

Automobile driving assistance systems are known comprising communication devices able to identify obstacles in a road circulation area via static sensors (that is to say, immobile sensors that are not embedded in autonomous motor vehicles, but installed near one or several traffic lanes) and to inform a piece of remote electronic equipment.

The installation configuration of these static sensors has only been optimized to date considering sensors of like technology, for example, cameras. However, when many obstacles are found in the area where the autonomous vehicle is traveling or when navigation conditions such as nighttime, rain, wind, cold or even ice, heat, etc. are present, the surveillance of this area is limited by the abilities of such sensors of like technology.

To address this, it is generally proposed to enrich such a set of sensors of like technology with one or several sensors of different technology able to provide additional surveillance and/or consolidation information.

However, to date, the optimization of the installation configuration of a set of sensors of different technologies has not been proposed, and has proven complex to implement in order to obtain the best possible compromise between coverage area and installation cost.

SUMMARY OF THE INVENTION

The aim of the invention is to address the drawbacks of the state of the art by proposing an electronic device for automatically selecting an installation configuration of a set of sensors that is effective, generic and independent of the number and/or technology or technologies of the sensors to be installed.

To that end, the invention relates to an electronic device for automatically selecting a surveillance configuration for a road traffic area by sensor(s) among a set of configurations of at least one sensor, the set comprising at least two separate configurations, the road traffic area being segmented into M different regions with $M \geq 1$, at least one coverage area being associated with each sensor, the device comprising:
  a determining module configured to determine intersections between each region and each coverage area, respectively;
  an optimization computing module configured to determine, from said intersections, at least one optimal surveillance configuration corresponding to a sensor configuration or a combination of sensor configurations providing at least one maximal coverage.

Thus, with the electronic selection device according to the invention, one systematically and quickly obtains the surveillance configuration providing maximal coverage relative to the set of possible sensor combinations and/or configurations, independently of the technology and/or number of sensors available.

The electronic selection device according to the invention is then particularly advantageous to configure or reconfigure a road traffic area in particular in case of new available sensor technology or modification of the considered traffic area for example by construction of a building, adding/removing a pedestrian crosswalk or a traffic light, or any other element able to modify the coverage area of one or several sensor(s) already installed in the considered area.

According to other advantageous aspects of the invention, the electronic selection device comprises one or more of the following features, considered alone or according to all technically possible combinations:
  the determining module is also configured to segment said road traffic area into said M separate regions and to associate, with each region m, with $1 \leq m \leq M$ of the plurality of different regions, a region polygon and/or a region polyhedron comprising K different apices, the coordinates of which are expressed in a coordinate system of the road traffic area to be surveilled, and wherein the determining module is also configured to associate, with each coverage area, a coverage area polygon and/or a coverage area polyhedron comprising L separate apices, the coordinates of which are expressed in the coordinate system of the road traffic area to be surveilled;
  the optimization computing module is configured also to use the number of sensors forming each possible combination of sensor(s) in order to determine the optimal surveillance configuration;
  the optimization computing module is configured also to use a cost associated with each sensor to determine the optimal surveillance configuration;

the optimization computing module is configured to compare the cost of each possible combination of sensor(s) with a predefined budget value;

the determining module is also configured to associate, with each region of the plurality of regions, a predetermined weight factor, and wherein the optimization computing module is configured also to use said weight factors to determine the optimal surveillance configuration;

the intersection determining module is configured to filter the intersections obtained in the presence of intersection(s) whereof the surface, or the weighted surface, is below a predetermined threshold;

the device comprises an initialization module configured to initialize at least one of the elements belonging to the group comprising:

segmenting the road traffic area into M separate regions;

weight factors respectively associated with each region;

the coverage area associated with each set of sensors;

the position and/or the orientation and/or the field of view and/or the technology of each sensor;

a predetermined intersection filtering threshold;

a cost associated with each sensor;

a predefined budget value.

The invention also relates to a method for automatically selecting a surveillance configuration for a road traffic area by sensor(s) among a set of configurations of at least one sensor, the set comprising at least two separate configurations, the road traffic area being segmented into M different regions with M≥1, at least one coverage area being associated with each sensor, the method being implemented by an electronic selection device, the device comprising at least:

determining intersections between each region and each coverage area, respectively;

from said intersections, computing an optimization of the optimal surveillance configuration corresponding to a sensor configuration or the combination of sensor configurations providing at least one maximal coverage.

The invention also relates to a computer program including software instructions which, when executed by a computer, implement a selection method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION OF THE PREFERRED EMBODIMENTS

In the rest of the description, the expression "substantially equal to" designates a relationship of equality to within plus or minus 10%, preferably to within plus or minus 5%.

Hereinafter, "sensor configuration" refers to the choice of at least one sensor parameter among the elements belonging to the group comprising:

the geographical installation position of the sensor, its orientation, its technology.

Furthermore, the "surveillance configuration" within the meaning of the present invention covers both the number of sensor(s) participating in the surveillance of the traffic area in question and the configuration of the participating sensor(s), as defined above.

Figure 1:
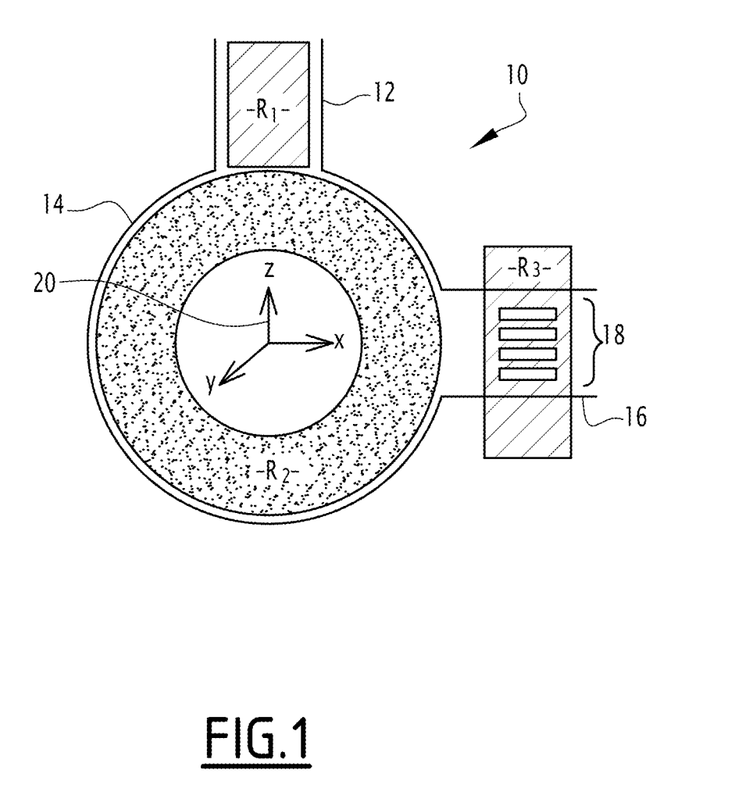
FIG. 1 is a schematic illustration of an exemplary road traffic area, the surveillance configuration of which by sensor(s) is able to be optimized according to the present invention.

FIG. 1 shows an exemplary road traffic area 10, the surveillance configuration of which is able to be optimized according to the present invention. The area 10 in particular comprises an access path 12, a roundabout 14, an exit path 16 on which a pedestrian crosswalk 18 is positioned.

Figure 3:
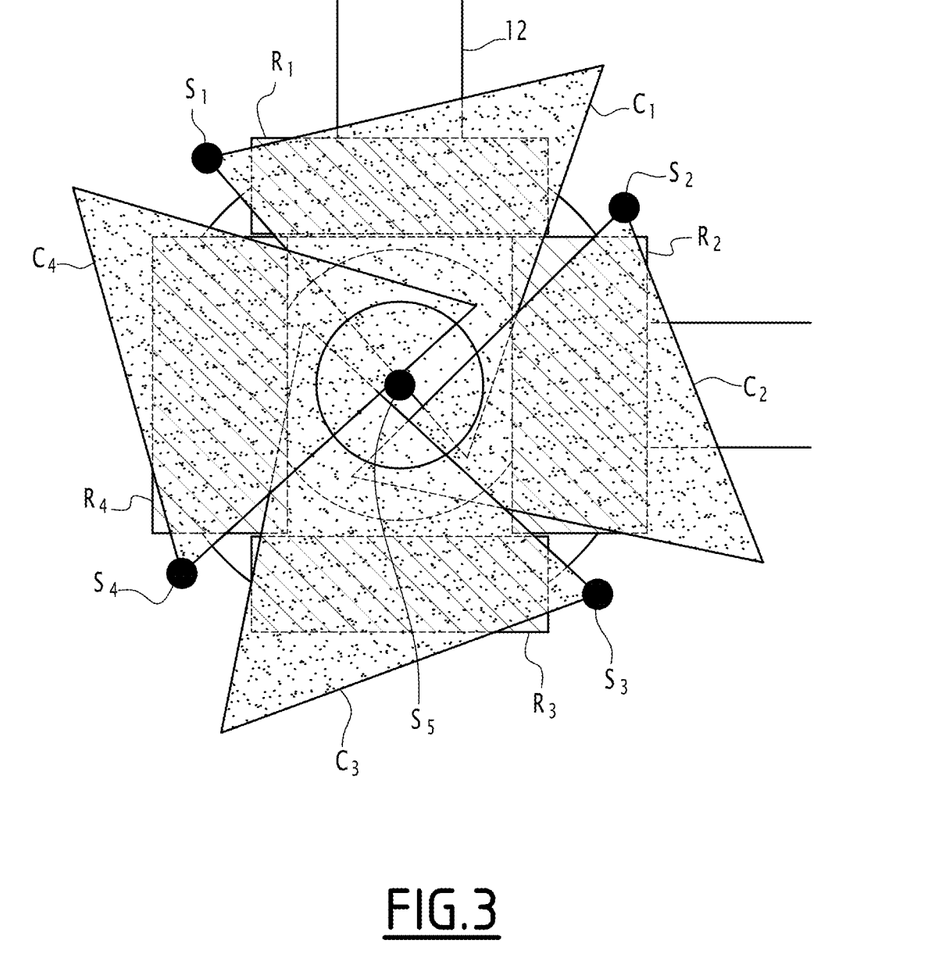

Such an area 10 is associated with a segmentation into M separate surveillance regions, for example as shown in FIG. 3, M=3 separate regions $R_1$, $R_2$, and $R_3$ respectively corresponding to an inner region $R_1$ of the access path 12, an inner region $R_2$ of the roundabout 14 and a region $R_3$ comprising the pedestrian crosswalk 18.

A coordinate system 20, for example the land-based coordinate system, or the Cartesian coordinate system (X, Y, Z), is associated with the road traffic area to be surveilled.

In terms of installation of new sensor(s) on a road traffic area such as the area 10 of FIG. 1, constraints must generally be taken into account, such as the reuse of static sensor(s) already installed in the road or an implantation in the ground specific to the installation of a new sensor with a given technology, which limits the number of possible surveillance configurations, the position/orientation of the sensors already installed not being able to be modified, and the implantations in the ground limiting the number of possible geographical positions as well as the orientation when the installation environment comprises potential obstructions of the field of view of the new sensor.

Figure 2:
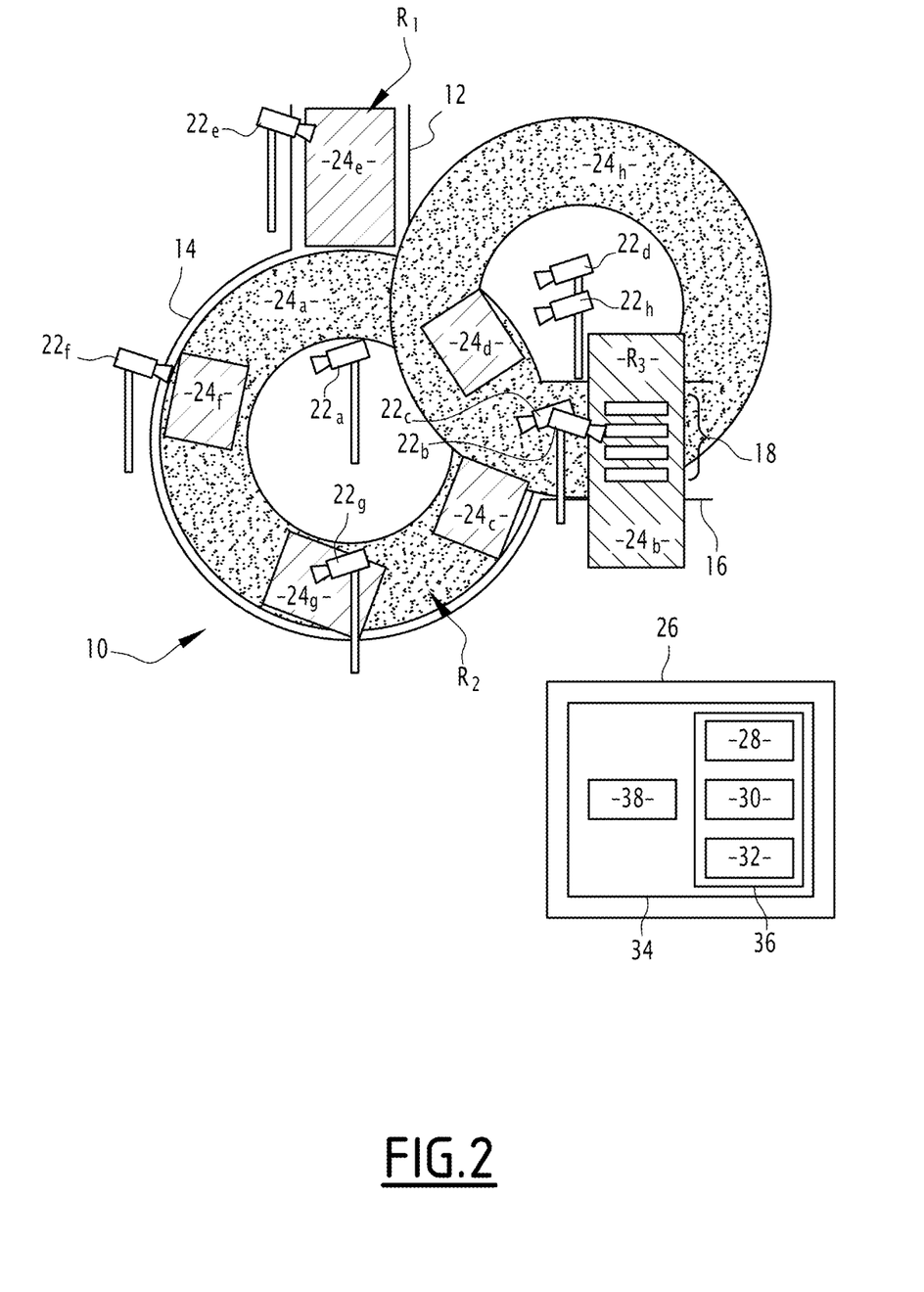
FIGS. 2 to 4 are illustrations of exemplary coverage area(s) associated with one or several sensor(s) able to be installed in the road traffic area of FIG. 1.

FIG. 2 shows an exemplary possible surveillance configuration based on a plurality of sensors $22_a$, $22_b$, $22_c$, $22_d$, $22_e$, $22_f$, $22_g$, $22_h$ installed in the road in the area of FIG. 1 previously disclosed and respectively their associated coverage area, namely $24_a$, $24_b$, $24_c$, $24_d$, $24_e$, $24_f$, $24_g$, $24_h$.

It should be noted that according to the present invention, depending on the installation position and/or the orientation and/or the activated sensor technology, several separate coverage areas (not shown in FIG. 2 for clarity reasons) could be associated with a same sensor.

In other words, the exemplary surveillance configuration of FIG. 2 is one possible example surveillance configuration among a plurality of possible surveillance configurations, but limited by the aforementioned installation constraints.

The static sensors 22 have a technology chosen from the sensor technology group comprising at least: a lidar (light detection and ranging), a leddar (light-emitting diode detection and ranging), a radar (radio detection and ranging), an ultrasound sensor, a photosensor or a camera.

For example, in FIG. 2, the sensors $22_a$ and $22_h$ are lidars characterized by a field of view of 360°, which corresponds to the circular depiction of the associated coverage areas $24_a$ and $24_h$. The sensors $22_b$, $22_c$, $22_d$, $22_e$, $22_f$, $22_g$ for example correspond to cameras whose field of view has an angular sector specific to each camera. For example, the sensors $22_b$, $22_c$ have a field of view of 40° versus 60° associated with the field of view of the sensors $22_d$, $22_e$.

The present invention proposes an electronic device 26 for automatically (that is to say, without human intervention) selecting an optimal surveillance configuration of the road traffic area 10.

To that end, the electronic device 26 comprises at least one determining module 28 configured to determine intersections between each region and each coverage area, respectively, and an optimization computing module 30 configured to determine, from said intersections, at least one optimal surveillance configuration corresponding to a sensor configuration or a combination of sensor configurations providing at least one maximal coverage.

Such an electronic device 26 is for example located remotely in a supervision platform of a transport network (not shown) or within a management community for urban development and/or roads, a design department, etc.

As an optional addition, the determining module 28 is also configured to segment said road traffic area into said M separate regions. To that end, the determining module 28 for example comprises a manual entry interface (a mouse, a touchpad, etc.) and an output screen, so as to be able to collect and process segmentation information entered by a user of the electronic device 26. For example, the user clicks, using the mouse, on a map, retrieved by the output screen, to define the regions of the segmentation.

In other words, the road traffic area 10 to be surveilled is, according to the present invention, segmented by the determining module 28 into a set of separate region(s) (or region(s) of interest for surveillance), and according to one specific variant, disjointed regions (that is to say, not overlapping):

$R = \{R_1, R_2, \ldots, R_m, \ldots, R_M\}$ where M is the total number of regions of interest.

Furthermore, according to one optional aspect, the determining module 28 is also configured to associate, with each region m, with $1 \leq m \leq M$ of the plurality of different regions, a region polygon $R_m$ and/or a region polyhedron $R_m$ comprising K different apices, the coordinates of which (two-dimensional for a polygon or three-dimensional for a polyhedron) are expressed in the coordinate system 20 of the road traffic area 10 to be surveilled with $R_m = \{p_m^1, p_m^2, \ldots, p_m^K\}$.

Additionally, as an optional addition, the determining module 28 is also configured to associate, with each coverage area n of each sensor (a same sensor being able to be associated with several separate coverage areas as a function of its installation position and/or its orientation and/or its technology), a polygon $C_n$ of coverage area and/or a polyhedron $C_n$ of coverage area comprising L separate apices, the coordinates of which are expressed in the coordinate system 20 of the road traffic area 10 to be surveilled $C_n = \{p_n^1, p_n^2, \ldots, p_n^L\}$.

In order to determine intersections between each region and each coverage area, respectively, the determining module 28 is in particular able to collect the set C of N possible coverage areas associated with the set of sensors available with $C = \{C_1, C_2, \ldots, C_N\}$ and to define, from the latter, another set V of individual surveillance configurations such that $V = \{V_1, V_2, \ldots, V_N\}$ with:

$V_n = \{v_{n,1}, v_{n,2}, \ldots v_{n,M}\}$ where $v_{n,m} = f(C_n, R_m)$ is the result of an automatic intersection determining function as for example described by B. alk, in "*Two efficient algorithms for determining intersection points between simple polygons*". *Computers &Geosciences*, 26(2), 137-151 (2000).

Such a function is in particular able to automatically provide the intersection between two polyhedrons or two polygons, and here is applicable to the specific problem according to the invention of determining an intersection between coverage areas and traffic regions to be surveilled.

As an optional addition, the determining module 28 is also configured to associate, with each region m of the plurality of separate regions, a weight factor $w_{n,m}$. In order to integrate this weight aspect, the intersection set $V_n$ is redefined as follows: $V_n = \{e_{n,1}, e_{n,2}, \ldots, e_{n,M}\}$ where each weighted intersection $e_{n,m}$ is such that $e_{n,m} = v_{n,m} w_{n,m}$.

According to one specific variant, the weight factor is a function of the coverage area $C_n$ of a considered sensor and expressed in the form $w_{n,m} = w_{R_m}(C_n)$, and the obtained resultant weighted intersection is $e_{n,m} = v_{n,m} w_{R_m}(C_n)$.

According to another specific variant, the weight factor is a function of the surface of the region. In other words, according to this other variant, each region $R_m$ is associated with its own weight factor, which is for example proportional to a predefined degree of importance associated with the surface of the region $R_m$. According to another specific variant, the weight factor is a function of the location of the region $R_m$. For example, the weight factor can be proportional to the associated accident risk. This risk can be computed from a database of accidentology and the categorization of the region $R_m$.

According to still another variant, the weight factor is both a function of the coverage area $C_n$ of a considered sensor and the location of the considered region $R_m$ and/or the surface of the region.

Indeed, as previously indicated, different sensor technologies can be used in order to determine an optimal surveillance configuration according to the present invention. A lidar is able to deliver, with precision (that is to say, an error below an error threshold of 5%, for example), the position and the speed of detected objects, but is not able to reliably rank the detected objects for example by associating them with a pedestrian category or vehicle category, etc. On the contrary, from a camera, the position and/or the speed of the detected object are obtained with less precision, compared with the results of the lidar, but the classification of the detected object is more reliable.

The application of a weight makes it possible to take account of such performances in order to optimize the surveillance configuration. For example, in the inner region $R_2$ of the roundabout 14, it is preferable to favor the obtainment of position and/or speed precision of a detected object to be transferred for example to an autonomous vehicle relative to the detected object classification, whereas in the region $R_3$ comprising the pedestrian crosswalk 18, priority is given to the classification making it possible to evaluate whether the detected object in the pedestrian crosswalk is indeed a pedestrian.

For the region $R_3$ comprising the pedestrian crosswalk 18, such priority given to the ability to classify the object by a sensor rather than its ability to determine the position and/or speed of the object is taken into account according to the present invention using the application of the aforementioned weight factor, namely for example:

$w_{R3}(24_b) = 1$ if the sensor $22_b$ is able to classify the detected objects, and otherwise $w_{R3}(24_b) = 0$. And for the inner region $R_2$ of the roundabout 14:

$w_{R2}(24_a) = w_{R2}(24_c) = w_{R2}(24_d) = w_{R2}(24_f) = w_{R2}(24_g) = 1$ if the sensors $22_a$, $22_c$, $22_d$, $22_f$, $22_g$ are respectively able to precisely locate the detected object, or otherwise $w_{R2}(24_a) = w_{R2}(24_c) = w_{R2}(24_d) = w_{R2}(24_f) = w_{R2}(24_g) = 0$.

As an alternative, the values of the weight factors are obtained from a performance index determined from an existing formal study. Indeed, the various cameras are able to present different detection performances, and as a result are associated with different performance indices.

According to another alternative, the weight is defined arbitrarily by a user as a function of the desired surveillance needs.

For example, $w_{R_m}(C_n)=0.5$ if the sensor associated with the coverage area $C_n$ is only able to classify the detected objects, $w_{R_m}(C_n)=0.5$ if the sensor associated with the coverage area $C_n$ is only able to locate the detected objects, $w_{R_m}(C_n)=1$ if the sensor associated with the coverage area $C_n$ is both able to classify and locate the detected objects, and $w_{R_m}(C_n)=0$ in all other cases.

Such an option makes it possible, according to another example, to favor the surveillance of some regions relative to others to especially strengthen security within these areas. For example, the area $R_3$ associated with the pedestrian crosswalk 18 is associated with a weight factor greater than that associated with the areas $R_1$ and $R_2$.

In the absence of weight $w_{n,m}=1$ irrespective of the index n or the index m.

As an optional addition, the intersection determining module 28 is configured to filter the intersections obtained in the presence of intersection(s) whereof the surface, or the weighted surface, is below a predetermined threshold, such as empty intersections. In this case, the variables $e_{n,m}$ whose value is below the threshold are set at zero.

From the set $V_n$ thus filtered by the determining module 28, the optimization computing module 30 is configured to define an optimization problem as:

$$o^* = \max_{o_q \in O} U(o_q)$$

with o* the optimal surveillance configuration among Q possible surveillance configurations (each indicated with the variable $o_q$ with $1 \leq q \leq Q$) of a set O of the Q possible surveillance configurations for example corresponding to all of the combinations of the individual surveillance configurations $V_n \in V$ or to certain combinations of the individual surveillance configurations (obtained after the filtering done by the determining module 28). The utility function $U(o_q)$ to be maximized is defined as: $U(o_q)=\alpha_{S_c}\overline{S_c(o_q)}+\alpha_{N_c}(1-\overline{N_c(o_q)})$ where $\overline{S_c(o_q)}$ is the normalized score of the surveillance configuration $o_q$, $\overline{N_c(o_q)}$ is the normalized number of sensors used in the surveillance configuration $o_q$, $\alpha_{S_c}$ et $\alpha_{N_c}$, the value of which is between 0 and 1, are the weights of importance of each optimization aspect with the constraint $\Sigma_i \alpha_i=1$. For example $\alpha_{S_c}=\alpha_{N_c}=0,5$. The score of a surveillance configuration $o_q$ is the sum of the weighted intersection scores of each sensor used:

$$S_c(o_q) = \sum_{n \forall V_n e_o}^{\square} \sum_{m=1}^{M} e_{n,m}$$

The normalization operation is defined as $\overline{d}=(d-d_{min})/(d_{max}-d_{min})$ where $d_{min}$ and $d_{max}$ are the minimum and maximum possible values for variable d. Here, the minimum and maximum values of scores and numbers of sensors in the set O are used to normalize the score is number of sensors of a surveillance configuration $o_q$.

In other words, the optimization computing module 30 is able to automatically solve an optimization problem by determining the combination of sensors and the configuration of each of these sensors able to deliver maximal coverage of the area 10, if applicable by minimizing the number of sensors used when $\alpha_{N_c} \neq 0$.

According to one particular additional and optional aspect of the invention, the determining module 28 is able to implement additional filtering, or elimination of subset(s), in the case where a region is covered by several sensors at once, only the maximum surface intersection (that is to say, maximum score) being retained and the other intersections being rejected.

According to another specific optional aspect, the optimization computing module 30 is configured also to use a cost associated with each sensor to determine the optimal surveillance configuration.

According to another specific optional aspect, wherein the optimization computing module 30 is also configured to compare the cost of each possible combination of sensor(s) with a predefined budget B value.

In this case, the surveillance configurations whose cost exceeds the budget B are excluded from the candidate solutions in the filtering phase. The cost of a surveillance configuration is quite simply the sum of the costs of the sensors used in this configuration.

According to another aspect, the costs of the sensors are integrated directly into the utility function:
$U(o_q)=\alpha_{S_c}\overline{S_c(o_q)}+\alpha_P(1-\overline{P(o_q)})$ where $\overline{P(o_q)}$ is the normalized cost of the surveillance configuration o et $\alpha_P$ is the cost aspect importance weight in the optimization problem. Like the first version of the utility function, the importance weights have the constraint $\Sigma_i \alpha_i=1$. This second utility function seeks a surveillance configuration that maximizes the score in order to obtain a maximal coverage and minimizes the cost of the sensors used.

According to another aspect, the costs as well as the number of sensors associated with each surveillance configuration $o_q$ are integrated directly into the utility function:

$$U(o_q)=\alpha_{S_c}\overline{S_c(o_q)}+\alpha_{N_c}(1-\overline{N_c(o_q)})+\alpha_P(1-P(o_q)).$$

Like the other versions of the utility function, the weights of importance have the constraint $\Sigma_i \alpha_i=1$. This third utility function seeks a surveillance configuration that maximizes the score in order to obtain a maximal coverage and minimizes the number and cost of the sensors used.

According to other examples, the utility function able to be used by the optimization computing module 30 can pertain to other elements (the number $N_r$ of regions covered, etc.).

As an optional addition, the device comprises an initialization module 32 configured to initialize at least one of the elements belonging to the group comprising:
  segmenting the road traffic area into M separate regions;
  weight factors respectively associated with each region;
  the coverage area associated with each set of sensors;
  the position and/or the orientation and/or the field of view and/or the technology of each sensor;
  a predetermined intersection filtering threshold;
  a cost associated with each sensor;
  a predefined budget value;
  one or several criteria and/or optimization rules able to be applied by the optimization computing module 30.

For example, such an initialization module is coupled to a module for manual entry of the initialization values or to a module for receiving these values sent by a remote sender.

In the example of FIG. 2, the electronic device 26 comprises an information processing unit 34 for example formed by a memory 36 and a processor 38 associated with the memory 36.

The memory 36 of the device 26 it is then able to store first determining software configured to determine intersections between each region and each coverage area, respectively, second optimization computing software configured to determine, from said intersections, at least one optimal surveillance configuration corresponding to a sensor configuration or a combination of sensor configurations providing at least one maximal coverage, and optionally third initialization software configured to initialize at least one of the elements belonging to the group comprising: the segmentation of the road traffic area into M separate regions; weight factors respectively associated with each region; the coverage area associated with each set of sensors; a predetermined intersection filtering threshold; a cost associated with each sensor; a predefined budget value.

The processor 38 is then able to execute each software application from among the first determining software, the second optimization computing software, and optionally the third initialization software.

In a variant that is not shown, the determining module 28, the optimization computing module 30 and, optionally the initialization module are each made in the form of a programmable logic component, such as an FPGA (Field Programmable Gate Array), or in the form of a dedicated integrated circuit, such as an ASIC (Application-Specific Integrated Circuit).

When part of the electronic device 26 is made in the form of one or several software programs, i.e., in the form of a computer program, this part is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

Figure 4:
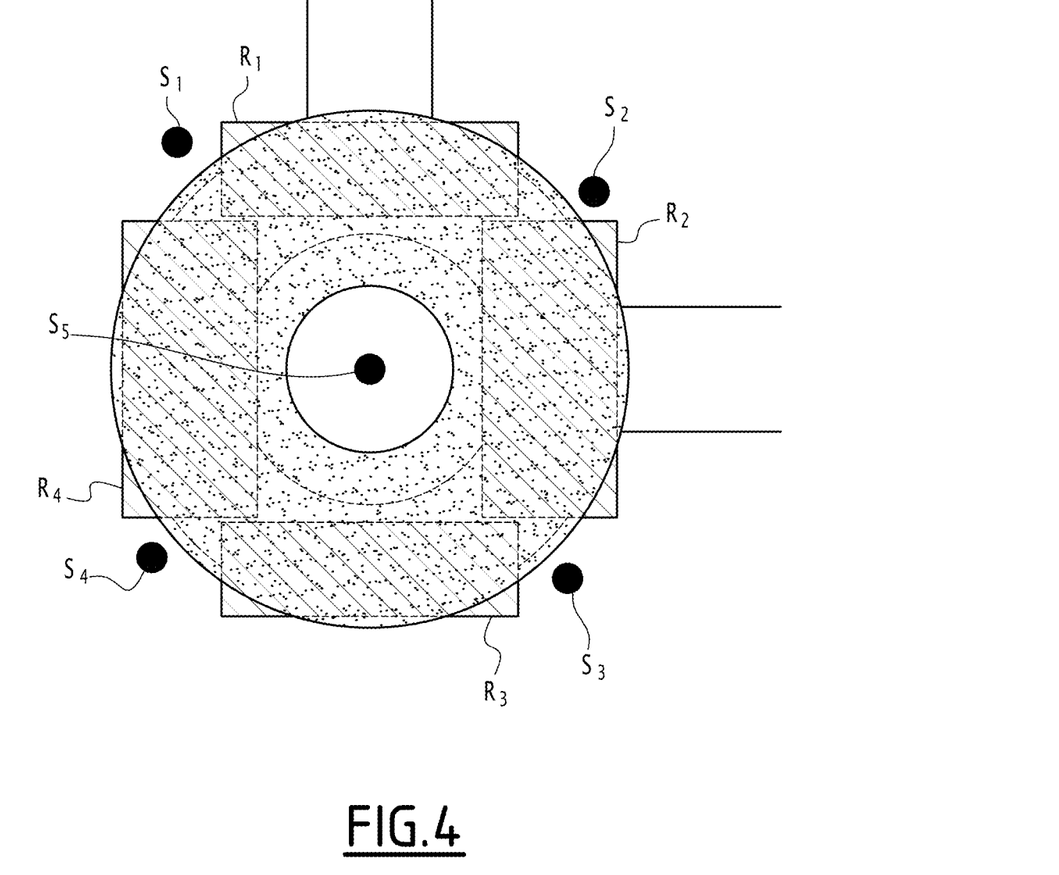

FIGS. 3 and 4 are illustrations of other examples of one or more coverage areas associated with one or more sensors able to be installed in different positions in the road traffic area 10 of FIG. 1, as an alternative to the possible configuration according to FIG. 2.

According to FIGS. 3 and 4, the segmentation of the road traffic area 10 able to be implemented, according to one option, by the determining module 28 comprises four separate rectangular regions $R_1$, $R_2$, $R_3$ and $R_4$, which preferably do not overlap, or have a maximum overlap between two regions in the order of 5% of their respective surface.

In order to best surveil these four regions $R_1$, $R_2$, $R_3$ and $R_4$, the set of possible surveillance configurations obtained from five separate sensors, namely $S_1$, $S_2$, $S_3$, $S_4$ and $S_5$, are able to be compared automatically by the device 26 according to the present invention.

In FIG. 3, the coverage area $C_1$, $C_2$, $C_3$, $C_4$, associated with the sensor configuration (that is to say, as a function of its position and orientation) of each of the sensors $S_1$, $S_2$, $S_3$, $S_4$, which makes it possible to cover a maximum of one or several of the segmentation regions $R_1$, $R_2$, $R_3$ and $R_4$, is shown. For example, $C_1$, $C_2$, $C_3$ are basic cameras costing €500, while the camera $C_4$ is a high-end camera relative to the cameras $C_1$, $C_2$, $C_3$ and is for example associated with a cost of €1000.

The surveillance configuration of FIG. 3 is one possible surveillance configuration among the plurality of possible surveillance configurations associated with the implementation of a maximum of five separate sensors. As an alternative, the sensors $S_1$, $S_2$, $S_3$, $S_4$ located outside the roundabout could use different technologies than the cameras, namely for example a lidar, but this alternative is less interesting in light of the regions $R_1$, $R_2$, $R_3$ and $R_4$, since part of the field of view of each lidar, that which does not "look at" the regions $R_1$, $R_2$, $R_3$ and $R_4$, would not be used.

In FIG. 4, the coverage $C_5$ associated with the sensor S5 is shown when the configuration of this sensor is such that it has the technology of an associated lidar, for example, at a cost of €2500.

The determining module 28 is able to determine the intersections indicated in the following first table:

|  |  | Regions | | | |
| --- | --- | --- | --- | --- | --- |
|  |  | $R_1$ | $R_2$ | $R_3$ | $R_4$ |
| Coverage areas | $C_1$ | $v_{1.1} = 0.95$ | $v_{1.2} = 0$ | $v_{1.3} = 0$ | $v_{1.4} = 0$ |
|  | $C_2$ | $v_{2.1} = 0$ | $v_{2.2} = 0.94$ | $v_{2.3} = 0.02$ | $v_{2.4} = 0$ |
|  | $C_3$ | $v_{3.1} = 0$ | $v_{3.2} = 0$ | $v_{3.3} = 0.96$ | $v_{3.4} = 0.01$ |
|  | $C_4$ | $v_{4.1} = 0.02$ | $v_{4.2} = 0$ | $v_{4.3} = 0$ | $v_{4.4} = 0.97$ |
|  | $C_5$ | $v_{5.1} = 0.99$ | $v_{5.2} = 0.97$ | $v_{5.3} = 0.98$ | $v_{5.4} = 0.96$ |

As an optional addition, a weighting of each region is able to be implemented by the determining module 28, then used by the computing module 30.

For example, $w_m(C_n)=0.5$ if the sensor associated with the coverage area $C_n$ is only able to classify the detected objects, $w_m(C_n)=0.5$ if the sensor associated with the coverage area $C_n$ is only able to locate the detected objects, $w_m(C_n)=1$ if the sensor associated with the coverage area $C_n$ is both able to classify and locate the detected objects, and $w_m(C_n)=0$ in all other cases.

The determining module 28 is then able to determine the weighted intersections as indicated in the following second table:

|  |  | Weighted regions | | | |
| --- | --- | --- | --- | --- | --- |
|  |  | $R_1$ | $R_2$ | $R_3$ | $R_4$ |
| Coverage areas | $C_1$ | $e_{1.1} = w_1(C_1)*v_{1.1} = 0.47$ | $e_{1.2} = w_2(C_1)*v_{1.2} = 0$ | $e_{1.3} = w_3(C_1)*v_{1.3} = 0.47$ | $e_{1.4} = w_4(C_1)*v_{1.4} = 0$ |
|  | $C_2$ | $e_{2.1} = w_1(C_2)*v_{2.1} = 0$ | $e_{2.2} = w_2(C_2)*v_{2.2} = 0.47$ | $e_{2.3} = w_3(C_2)*v_{2.3} = 0.01$ | $e_{2.4} = w_4(C_2)*v_{2.4} = 0$ |
|  | $C_3$ | $e_{3.1} = w_1(C_3)*v_{3.1} = 0$ | $e_{3.2} = w_2(C_3)*v_{3.2} = 0$ | $e_{3.3} = w_3(C_3)*v_{3.3} = 0.48$ | $e_{3.4} = w_4(C_3)*v_{3.4} = 0$ |
|  | $C_4$ | $e_{4.1} = w_1(C_4)*v_{4.1} = 0.02$ | $e_{4.2} = w_2(C_4)*v_{4.2} = 0$ | $e_{4.3} = w_3(C_4)*v_{4.3} = 0$ | $e_{4.4} = w_4(C_4)*v_{4.4} = 0.97$ |
|  | $C_5$ | $e_{5.1} = w_1(C_5)*v_{5.1} = 0.49$ | $e_{5.2} = w_2(C_5)*v_{5.2} = 0.48$ | $e_{5.3} = w_3(C_5)*v_{5.3} = 0.49$ | $e_{5.4} = w_4(C_5)*v_{5.4} = 0.96$ |

According to one option, the determining module 28 is able to filter the intersections, if applicable as weighted above, as indicated in the following third table by filtering them (that is to say, by eliminating them as barred in the table below) when the intersection surface is below a predetermined threshold, for example 10% (that is to say, 0.1) of the surface of the considered region:

| Candidate configuration $o_q$ | $S_c$ | $N_r$ | P | $N_c$ | |
|---|---|---|---|---|---|
| $V_1 + V_2 + V_3$ | 0.47 + 0.47 + 0.48 = 1.42 | 3 | 1500 | 3 | 1 |
| $V_1 + V_2 + V_3 + V_4$ | 2.39 | 4 | 2500 | 4 | 2 |

| | | Weighted regions | | | |
|---|---|---|---|---|---|
| | | $R_1$ | $R_2$ | $R_3$ | $R_4$ |
| Coverage areas | $C_1$ | $e_{1,1} = w_1(C_1)*v_{1,1} = 0.47$ | ~~$e_{1,2}=w_2(C_1)*v_{1,2}=0$~~ | ~~$e_{1,3}=w_3(C_1)*v_{1,3}=0$~~ | ~~$e_{1,4}=w_4(C_1)*v_{1,4}=0$~~ |
| | $C_2$ | ~~$e_{2,1}=w_1(C_2)*v_{2,1}=0$~~ | $e_{2,2} = w_2(C_2)*v_{2,2} = 0.47$ | ~~$e_{2,3}=w_3(C_2)*v_{2,3}=0.01$~~ | ~~$e_{2,4}=w_4(C_2)*v_{2,4}=0$~~ |
| | $C_3$ | ~~$e_{3,1}=w_1(C_3)*v_{3,1}=0$~~ | ~~$e_{3,2}=w_2(C_3)*v_{3,2}=0$~~ | $e_{3,3} = w_3(C_3)*v_{3,3} = 0.48$ | ~~$e_{3,4}=w_4(C_3)*v_{3,4}=0$~~ |
| | $C_4$ | ~~$e_{4,1}=w_1(C_4)*v_{4,1}=0.02$~~ | ~~$e_{4,2}=w_2(C_4)*v_{4,2}=0$~~ | ~~$e_{4,3}=w_3(C_4)*v_{4,3}=0$~~ | $e_{4,4} = w_4(C_4)*v_{4,4} = 0.97$ |
| | $C_5$ | $e_{5,1} = w_1(C_5)*v_{5,1} = 0.49$ | $e_{5,2} = w_2(C_5)*v_{5,2} = 0.48$ | $e_{5,3} = w_3(C_5)*v_{5,3} = 0.49$ | $e_{5,4} = w_4(C_5)*v_{5,4} = 0.96$ |

The result final set V amounts to $V=\{V_1, V_2, V_3, V_4, V_5\}$ with:

$V_1=\{e_{1,1}\}, V_2=\{e_{2,2}\}, V_3=\{e_{3,3}\}, V_4=\{e_{4,4}\}, V_5=\{e_{5,1}, e_{5,2}, e_{5,3}, e_{5,4}\}$.

From this final set V received as input, as previously indicated, the computing module 30 according to the invention implements an optimization algorithm able to determine a coverage score associated with each candidate configuration $o_q$ corresponding to each possible combination of subsets of V among thirty-one possible combinations obtained and tested automatically (that is to say, without human intervention) corresponding to five combinations of one element of V among five, ten combinations of two elements of V among five, ten combinations of three elements among five, five combinations of four elements among five and one combination of five elements among five and to select the optimal candidate operation o* as a function of predetermined optimization criteria or which are reconfigurable via the initialization module 32.

According to one particular additional and optional aspect of the invention, the determining module 28 is able to implement additional filtering, or elimination of subset(s), in the case where a region is covered by several sensors at once, only the maximum surface intersection (that is to say, maximum score) being retained and the other intersections being rejected. For example, in the case of a first candidate configuration corresponding to the set $\{V_1, V_2, V_3, V_4, V_5\}$, $v_{1,1}$ and $v_{5,1}$ overlapping and $v_{1,1}=0.95<v_{5,1}=0.99$ such that $v_{1,1}$ is ignored and as a result the set $V_1$ in its entirety. The same is true for $V_2$ and $V_3$ and $v_{5,4}=0.96<v_{4,4}=0.97$ as a result, the first candidate configuration is reduced to $\{V_4, V'_5\}$ with $V'_5=\{v_{5,1}, v_{5,2}, v_{5,3}\}$. This optional elimination capability of the determining module 28 then makes it possible to potentially reduce the number of combinations to be processed by the optimization computing module 30 and therefore to accelerate the computing time.

In relation with the example of FIGS. 3 and 4, among the 31 possible candidate configurations and after elimination, the optimization computing module 30 is able to determine the most relevant candidate configurations of the following fifth table, according to which each candidate configuration $o_q$ has an associated coverage score $S_c$, the number of covered regions $N_r$, the cost P, the number of sensors $N_c$ implemented in the candidate configuration, an identifier of the candidate configuration.

-continued

| Candidate configuration $o_q$ | $S_c$ | $N_r$ | P | $N_c$ | |
|---|---|---|---|---|---|
| $V_5$ | 1.94 | 4 | 2500 | 1 | 3 |
| $V_4 + V_5$ | 2.43 | 4 | 3000 | 2 | 4 |

The optimization computing module 30 is able to implement a utility function U(c) in order to express the optimization problem of the surveillance of a road traffic area according to the present invention and to determine the optimal configuration as a function of predetermined or reconfigurable optimization criteria.

For example, a first possible utility function is expressed in the form $U_1(o_q)=\alpha_{S_c}\overline{S_c(o_q)}+\alpha_{N_c}(1-\overline{N_c(o_q)})$ with $\overline{S_c(o_q)}$ the normalized score (that is to say, the value of which is between 0 and 1 by normalization of the score after obtaining all of the scores of each candidate configuration and use of the maximum score $S_{cmax}$ and the minimum score $S_{cmin}$ such as, $$\overline{S_c(o_q)} = \left(\frac{S_c(o_q) - S_{cmin}}{S_{cmax} - S_{cmin}}\right), \overline{N_c(o_q)}$$

the normalized value of the number of sensor(s) used in the candidate configuration $o_q$ in question, $\alpha_{S_c}$ and $\alpha_{N_c}$ of the optimization criteria corresponding to weights as a function of the desired optimization needs such that $\alpha_{S_c}+\alpha_{N_c}=1$. Thus if $\alpha_{S_c}=0$ and $\alpha_{N_c}=1$, the optimization problem seeks only for example to limit the number of sensors to be installed. If, on the contrary, if $\alpha_{N_c}=0$ and $\alpha_{S_c}=1$ then the optimization problem seeks to obtain the maximum coverage (that is to say, the maximum score), values strictly between 0 and 1 of $\alpha_{S_c}$ and $\alpha_{N_c}$ are optimization criteria indicating that the optimization must both pertain to the coverage and the number of sensors.

A second possible utility function is expressed in the form:

$U_2(o_q)=\alpha_{S_c}\overline{S_c(o_q)}+\alpha_P(1-\overline{P(o_q)})$ with $\overline{P(o_q)}$ the normalized cost and $\alpha_P$ the associated weight such as $\alpha_{S_c}+\alpha_P=1$. A second function makes it possible to turn the optimization problem to the maximum coverage and/or the installation cost.

A third possible utility function is expressed in the form:

$$U_3(o_q) = \alpha_{S_c}\overline{S_c(o_q)} + \alpha_{N_c}(1 - \overline{N_c(o_q)}) + \alpha_P(1 - \overline{P(o_q)})$$

with $\alpha_{S_c} + \alpha_{N_c} + \alpha_P = 1$. Such a third function makes it possible to turn the optimization problem at once to the maximum coverage and/or the installation cost and/or the number of sensors.

According to other examples, the utility function able to be used by the optimization computing module 30 can pertain to the number of regions covered $N_r$, etc.

From such a utility function, according to one of the aforementioned examples, the optimization computing module 30 is able to define the optimization aim as a function of predetermined or reconfigurable optimization rules via the initialization module 32.

Such rules are in particular associated with the weight values used.

For example, if $\alpha_{S_c} = 1$, the optimization problem can be summarized by a maximum coverage problem while the corresponding rule seeks to find the optimal configuration o* that guarantees the maximum value of the utility function:

$$o^* = \max_{o_q \in O} U(o_q)$$

which corresponds to the candidate configuration with identifier 4 corresponding to the combination of the sensors $S_4$ and $S_5$ associated with the maximum score 2.43.

If $\alpha_{N_c} = 1$, the optimization problem is summarized by a problem of limiting the number of sensors while the corresponding rule seeks to find the optimal configuration o* that guarantees the maximum value of the utility function:

$$o^* = \max_{o_q \in O} U(o_q)$$

which corresponds to the minimum value of the number of sensors, which in particular corresponds to the candidate configuration with identifier 3 corresponding to only sensor $S_5$ when the optional elimination step has been carried out. In the absence of application of this elimination step, several other optimal solutions implementing a single sensor would result from solving the optimization problem.

If $\alpha_P = 1$, the optimization problem is summarized by a cost problem, and according to a first corresponding rule, seeks to find the optimal configuration o* that guarantees the maximum value of the utility function $$o^* = \max_{o_q \in O} U(o_q)$$

which corresponds to the minimum cost value and as a result, when the optional elimination step has been implemented, to the candidate configuration with identifier 1 corresponding to the combination of sensors $S_1$, $S_2$, and $S_3$ whose cost is €1500 (in the absence of the application of this elimination step, several other optimal solutions implementing a single sensor corresponding to a single camera whose cost is €500 would result from solving the optimization problem), or according to a second corresponding rule subjects the function $U(o_q)$ to a budget B, for example B=€3000, for example by looking for the combination o* such that $U(o_q) > €3000$, namely, when the optional elimination step has been implemented, the candidate configuration with identifier 4 corresponding to the combination of sensors $S_4$ and $S_5$.

If $\alpha_{S_c} = \alpha_P = 0.5$, the optimization problem aims to determine the optimal candidate configuration that makes it possible to address both the optimization rule regarding the coverage and the cost, namely, for example, the candidate configuration with identifier 2 corresponding to the combination of sensors $S_1$, $S_2$, $S_3$ and $S_4$ that makes it possible to obtain a coverage score of 2.39 while having a moderate cost.

To solve the optimization problem of the aforementioned utility functions, the optimization computing module 30 is able to use any optimization algorithm that makes it possible to achieve the desired aim specifically according to the present invention, for example a greedy optimization algorithm.

One skilled in the art will understand that the illustrative examples used in relation with FIGS. 3 and 4 are relatively simple for clarity reasons, but that the device according to the present invention can solve more complex optimization problems taking account of a number of possible configurations and more sensors than those used in relation with FIGS. 2 to 4, so as to determine an optimal surveillance configuration in light of a plurality of possible combinations of sensor(s) and their own configuration (in position, orientation, technology type) that would be impossible to determine reliably and in a predefined time exclusively in one's head.

It should be noted that the exemplary road traffic area 10 of FIGS. 1 to 4 is not limiting and that the present invention is applicable to optimize the surveillance of other types of road traffic area, in particular able to be traveled by an autonomous vehicle, such as a circulation area comprising an intersection, a circulation area comprising traffic lights, a circulation area comprising a leveled passage, a circulation area comprising a road interchange, or any other type of road traffic area requiring the establishment of surveillance to increase security.

Figure 5:
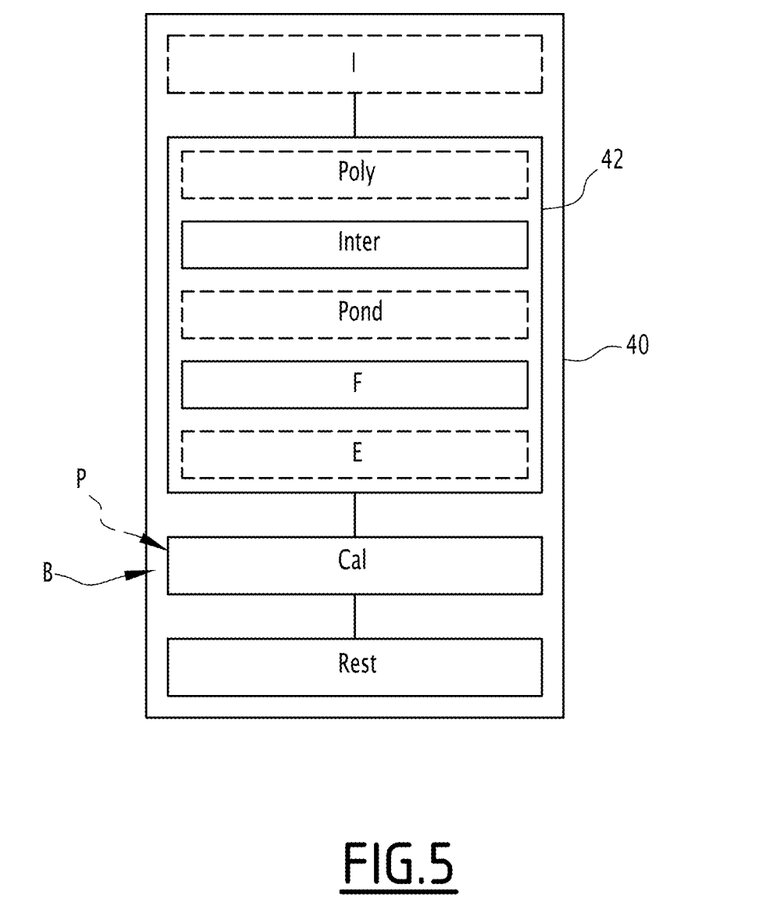
FIG. 5 is a flowchart of a supervision method according to the invention.

The operation of the electronic device for automatically selecting a surveillance configuration will now be explained using FIG. 5, showing a flowchart of the method 40 according to the invention for automatically selecting a surveillance configuration for a road traffic area by sensor(s) among a set of configurations of at least one sensor, the set comprising at least two separate configurations, the road traffic area being segmented into M different regions with M≥1, at least one coverage area being associated with each sensor, the method 40 being implemented by the electronic selection device 26.

During an initial optional step I, the electronic selection device 26 initializes, via the initialization module 32, at least one of the elements belonging to the group comprising:
  segmenting the road traffic area into M separate regions;
  weight factors respectively associated with each region;
  the coverage area associated with each set of sensors;
  the position and/or the orientation and/or the field of view and/or the technology of each sensor;
  a predetermined intersection filtering threshold;
  a cost associated with each sensor;
  a predefined budget value.

During a following step 42, the device 26 proceeds, via its determining module 28, with the construction of a set of intersections between each region of the segmented road traffic area and each coverage area associated with a given sensor configuration.

Such a step 42 is optionally able to comprise sub-steps, such as the Poly sub-step during which the determining module 28 is able to segment said road traffic area into said M separate regions and to associate, with each region m, with 1≤m≤M of the plurality of different regions, a region polygon $R_m$ and/or a region polyhedron $R_m$ comprising K different apices, the coordinates of which are expressed in a coordinate system of the road traffic area to be surveilled, and to associate, with each coverage area $C_n$, a coverage area $C_n$ polygon and/or a coverage area polyhedron comprising L separate apices, the coordinates of which are expressed in the coordinate system of the road traffic area to be surveilled.

The sub-step Poly is then followed by the sub-step Inter, where, from the polygons and/or polyhedrons respectively associated with the regions and the coverage areas, the intersections are obtained.

Then, according to another optional intermediate sub-step Pond, a weighting factor is associated with each region of the road traffic area to be surveilled.

According to one specific aspect, another optional step F follows the optional step Pond, namely filtering able to ignore the intersections whereof the surface, or the weighted surface, is below a predetermined threshold.

According to another optional aspect, another step E follows the optional step F and consists of an elimination of subset(s), in the case where a region is covered by several sensors at once, only the maximum surface intersection being retained and the other intersections being rejected.

Then, a step Cal is implemented via the optimization computing module 30 of the device 26 to provide the optimal surveillance configuration corresponding to a sensor configuration or a combination of sensor configurations providing at least one maximal coverage.

Such a step Cal is able to take account of the cost $C_O$ of each sensor participating in the considered candidate configuration, and if applicable a budget B to solve a maximum coverage problem subject to a budget.

Lastly, a retrieval step Rest is carried out to provide the resultant surveillance configuration to an operator, for example by visual display or by sound retrieval.

Thus, the electronic selection device according to the present invention is able to provide an optimal surveillance configuration respective of the optimization complexity associated with the number of possible sensor configuration combinations to be studied.

Additionally, when an installation budget of the configuration must be respected, the solved optimization problem according to the present invention is able to be adapted to respect said budget while maximizing the obtained surveillance coverage.

One can thus see that the selection device according to the invention participates in offering more effective surveillance of the scene around motor vehicle, in particular around an autonomous motor vehicle.

What is claimed is:

1. An electronic device for automatically selecting a surveillance configuration for a road traffic area by sensor(s) among a set of configurations of at least one sensor, the set comprising at least two separate configurations, the road traffic area being segmented into M different regions with M≥1, at least one coverage area being associated with each sensor;
the device comprising a processor configured to:
determine intersections between each region and each coverage area, respectively; and
determine, by using said intersections, at least one optimal surveillance configuration corresponding to a sensor configuration or a combination of sensor configurations providing at least one maximal coverage,
wherein the processor is configured to filter the intersections obtained in the presence of intersection(s) whereof a surface, or a weighted surface, is below a predetermined threshold.

2. The device according to claim 1, wherein the processor is also configured to segment said road traffic area into said M separate regions and to associate, with each region m, with 1≤m≤M of the plurality of different regions, a region polygon and/or a region polyhedron comprising K different apices, the coordinates of which are expressed in a coordinate system of the road traffic area to be surveilled, and wherein the processor is also configured to associate, with each coverage area, a coverage area polygon and/or a coverage area polyhedron comprising L separate apices, the coordinates of which are expressed in the coordinate system of the road traffic area to be surveilled.

3. The device according to claim 1, wherein the processor is configured also to use a number of sensors forming each possible combination of sensor(s) in order to determine the optimal surveillance configuration.

4. The device according to claim 1, wherein the processor is configured also to use a cost associated with each sensor to determine the optimal surveillance configuration.

5. The device according to claim 4, wherein the processor is configured to compare the cost of each possible combination of sensor(s) with a predefined budget value.

6. The device according to claim 1, wherein the processor is also configured to associate, with each region of the plurality of different regions, a predetermined weight factor, and wherein the processor is configured also to use said weight factors to determine the optimal surveillance configuration.

7. The device according to claim 1, wherein the processor is also configured to initialize at least one of the elements selected from the group consisting of:
segmenting the road traffic area into M separate regions;
weight factors respectively associated with each region;
the coverage area associated with each set of sensors;
the position and/or the orientation and/or the field of view and/or the technology of each sensor;
a predetermined intersection filtering threshold;
a cost associated with each sensor; and
a predefined budget value.

8. The device according to claim 1, wherein the processor comprises a Field Programmable Gate Array (FPGA) or a dedicated integrated circuit.

9. A method for automatically selecting a surveillance configuration for a road traffic area by sensor(s) among a set of configurations of at least one sensor, the set comprising at least two separate configurations, the road traffic area being segmented into M different regions with M≥1, at least one coverage area being associated with each sensor, the method being implemented by an electronic selection device, the method comprising:
determining intersections between each region and each coverage area, respectively; and
by using said intersections, computing an optimization of the optimal surveillance configuration corresponding to a sensor configuration or the combination of sensor configurations providing at least one maximal coverage,
filtering the intersections obtained in the presence of intersection(s) whereof a surface, or a weighted surface, is below a predetermined threshold.

10. A non-transitory computer readable medium having a program stored thereon, the program executed by a computer to carry out a selection method according to claim 9.

\* \* \* \* \*